(12) United States Patent
Yuan et al.

(10) Patent No.: US 8,300,704 B2
(45) Date of Patent: Oct. 30, 2012

(54) PICTURE PROCESSING VIA A SHARED DECODED PICTURE POOL

(75) Inventors: Yu Yuan, Beijing (CN); Rong Yan, Beijing (CN); Sheng Xu, Shanghai (CN); Xing Liu, Shanghai (CN); Huo Ding Li, Liu Zhou (CN)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 12/177,212

(22) Filed: Jul. 22, 2008

(65) Prior Publication Data

US 2010/0020885 A1 Jan. 28, 2010

(51) Int. Cl.
*H04N 7/12* (2006.01)
(52) U.S. Cl. .................................. 375/240.26
(58) Field of Classification Search ............. 375/240.01, 375/240.25, 240.26
See application file for complete search history.

(56) References Cited

U.S. PATENT DOCUMENTS

| | | | |
|---|---|---|---|
| 5,477,445 A | 12/1995 | Weber | |
| 5,583,500 A | 12/1996 | Allen | |
| 5,883,671 A | 3/1999 | Keng | |
| 6,275,535 B1 | 8/2001 | Bramley | |
| 6,309,424 B1 | 10/2001 | Fallon | |
| 7,043,584 B2 | 5/2006 | Schultz | |
| 7,262,722 B1 | 8/2007 | Jahanghir | |
| 7,334,191 B1 | 2/2008 | Sivan | |
| 7,373,003 B2 | 5/2008 | Mitchell | |
| 2005/0122347 A1 | 6/2005 | Buerkle | |
| 2008/0095232 A1 | 4/2008 | Boice | |
| 2008/0112483 A1 | 5/2008 | Lu | |
| 2009/0002379 A1* | 1/2009 | Baeza et al. ............ 345/522 |
| 2009/0052542 A1* | 2/2009 | Romanovskiy et al. . 375/240.24 |

OTHER PUBLICATIONS

Fleck, Implementation of PAFF-interlacing into an existing H.264 decoder for the Cell microprocessor, Thesis, University of Tubingen, 62 pages, Nov. 2007.*
Schaeffer—"The Emerging H.264 Standard" —EBU Technical Review (Jan. 2003).
Terada—"Real Time Low Bit-Rate Video Coding Algorithm Using Multi-Stage Hierarchical Vector Quantization"; IEEE (1998).
Wang—High Throughput and Low Memory Access Sub-pixel Interpolation Architecture for H.264/AVC HDTV Decoder (Aug. 2005).
Wiegand1—"Overview of the H.264 / AVC Video Coding Standard" IEEE Transactions on Circuits and Systems for Video Technology; (Jul. 2003).
Wiegand2—"Draft ITU-T Recommendation and Final Draft International Standard of Joint Video Specification" ; Draft ISO/IEC 14496-10 : 2002.

(Continued)

*Primary Examiner* — Frank Duong
(74) *Attorney, Agent, or Firm* — Matt Talpis; Mark P Kahler (57) ABSTRACT

An information handling system (IHS) may include a processor with multiple compute elements that decode pictures from an encoded video bitstream. Each compute element may perform a different part or sequential stage of a picture decoding process to obtain decoded pictures. A memory includes a decoded picture buffer that associates with a first stage of the sequential stages. The memory may also include respective decoded picture buffer snapshots for sequential stages other than the first sequential stage. A last sequential stage provides fully decoded pictures to a decoded picture pool in memory. The decoded picture buffer and decoded picture buffer snapshots may store pointers to decoded pictures in the decoded picture pool that the sequential stages need to perform decoding of pictures. In this manner, the sequential stages may share decoded pictures that the decoded picture pool stores.

19 Claims, 4 Drawing Sheets

OTHER PUBLICATIONS

OHM—"Introduction to MPEG-4 Advanced Video Coding", ISO/IEC JTC1/SC29/WG11, Poland (Jul. 2005).

Song—"Reference Frame Data Compression Method for H264/AVC"; IEICE (Jul. 2005).

* cited by examiner

```
401    decoding_picture_in_stage_N = decoding_picture_in_stage_N-1;
402    DPB_snapshot_in_stage_N = DPB_snapshot_in_stage_N-1;
403    decoding_picture_in_stage_N-1 = decoding_picture_in_stage_N-2;
404    DPB_snapshot_in_stage_N-1 = DPB; // DPB is in stage N-2
405    decoding_picture_in_stage_N-2 = next picture;
406    update( DPB );
```

FIG. 4B

```
407    for ( pic = every picture in DPB_snapshot_in_stage_N )
408    {
409        if ( pic is not in DPB_snapshot_in_stage_N-1 )
410            remove pic from the pool;
411    }
401    decoding_picture_in_stage_N = decoding_picture_in_stage_N-1;
402    DPB_snapshot_in_stage_N = DPB_snapshot_in_stage_N-1;
403    decoding_picture_in_stage_N-1 = decoding_picture_in_stage_N-2;
404    DPB_snapshot_in_stage_N-1 = DPB; // DPB is in
405    decoding_picture_in_stage_N-2 = next picture;
406    update( DPB );
```

PICTURE PROCESSING VIA A SHARED DECODED PICTURE POOL

BACKGROUND

The disclosures herein relate generally to information handling systems (IHSs), and more specifically, to information handling systems that decode encoded pictures.

Information handling system may transmit video in several different encoded formats. Video typically includes a bitstream that represents a sequence of pictures, one after the other. A video encoder operates on a raw video bitstream to generate encoded or compressed video. Compressed video consumes less bandwidth than raw unencoded video. A decoder decodes the encoded video before displaying the decoded video to a user or viewer.

BRIEF SUMMARY

In one embodiment, a method of decoding pictures is disclosed. The method includes receiving an encoded bitstream that includes pictures. The method also includes partitioning decoding of the pictures of the encoded bitstream into N sequential process stages that process the pictures as decoding pictures, wherein N is the number of sequential process stages. The method further includes mapping the sequential process stages onto N compute elements that execute in parallel. The method still further includes storing, in a system memory, a decoded picture buffer for a first stage of the N sequential process stages, the first stage receiving the encoded bitstream. The method also includes storing, in the system memory, a respective decoded picture buffer snapshot for each of the sequential process stages other than the first sequential process stage. The method further includes storing, in the system memory, a decoded picture pool of decoded pictures for sharing among the sequential process stages.

In another embodiment, an information handling system (IHS) is disclosed. The IHS includes a processor and a memory coupled to the processor. The processor includes multiple compute elements that decode pictures from an encoded bitstream. The processor partitions the decoding of pictures into N sequential process stages that process the pictures as decoding pictures, wherein N is the number of sequential process stages. Each compute element performs a different sequential process stage of the N sequential process stages. The compute elements may execute in parallel. The memory stores a decoded picture buffer associated with a first stage of the N sequential process stages, the first stage receiving the encoded bitstream. The memory also stores a respective decoded picture buffer snapshot for each of the sequential process stages other than the first sequential process stage. The memory further stores a decoded picture pool of decoded pictures for sharing among the sequential process stages.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In one embodiment, a decoding mechanism decodes an encoded bitstream that includes pictures. The decoding mechanism may partition the decoding of pictures into sequential process stages, and map the sequential process stages onto respective compute elements that execute in parallel. One sequential process stage may employ a decoded picture buffer while the remaining sequential stages employ respective decoded picture snapshots. The sequential process stages may share a decoded picture in a decode picture pool that each sequential process stage may access. This may reduce the number of copies of decoded pictures that the decoding mechanism needs to process pictures.

Figure 1:
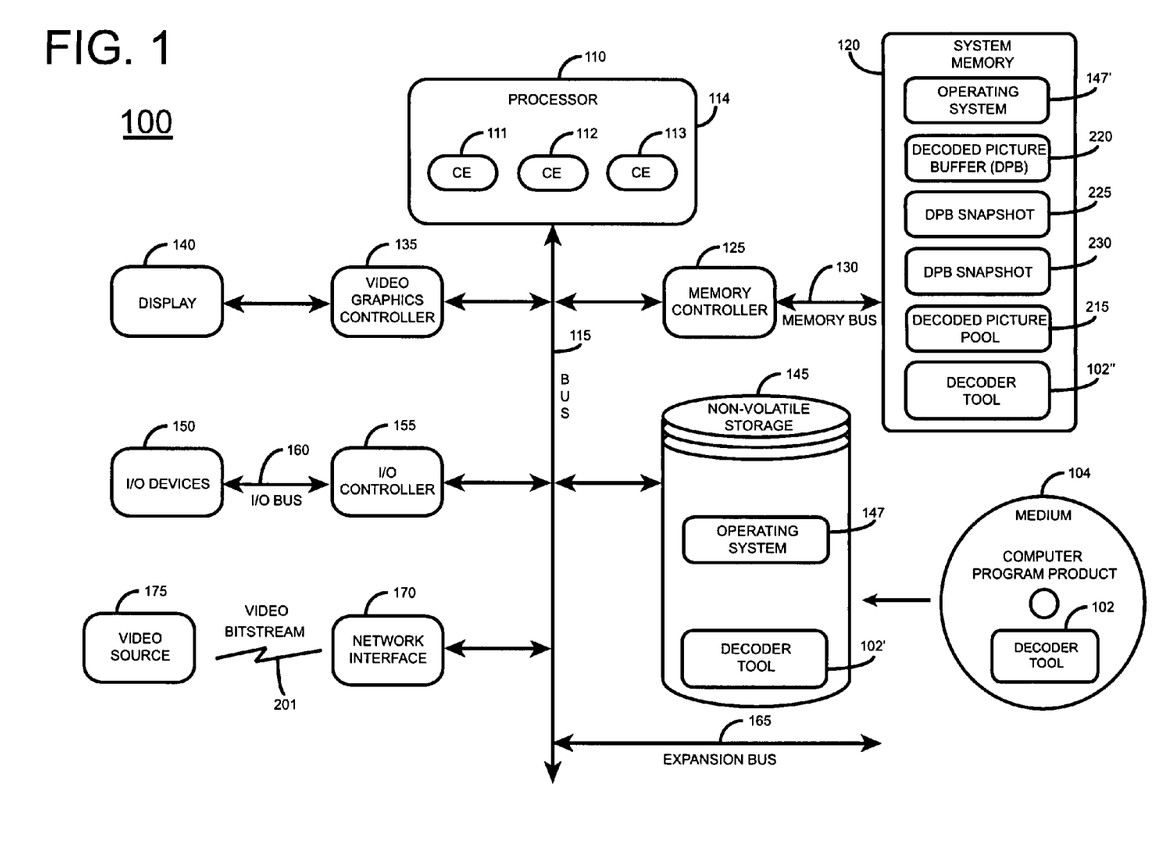
FIG. 1 shows a block diagram of one embodiment of the disclosed information handling system (IHS).

FIG. 1 shows an information handling system (IHS) 100 that includes a video decoder or video decoder tool 102. Hardware and software implementations of the disclosed video decoder are both possible. IHS 100 may initially store video decoder tool 102 as a computer program product on a medium 104, such as a CD, DVD or other medium. In this particular embodiment, IHS 100 includes a processor 110 having multiple compute elements (CEs) such as CE 111, CE 112 and CE 113 on a common semiconductor die 114. Compute elements CE 111, CE 112 and CE 113 may be cores of a multi-core processor. IHS 100 processes, transfers, communicates, modifies, stores or otherwise handles information in digital form, analog form or other form. IHS 100 includes a bus 115 that couples processor 110 to system memory 120 via a memory controller 125 and memory bus 130. In one embodiment, system memory 120 is external to processor 110. Processor 110 may also includes local memory (not shown) such as L1 and L2 caches (not shown) on semiconductor die 114. A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. Operating system 147 loads in memory 120 to govern the operation of IHS 100. I/O devices 150, such as a keyboard and a mouse pointing device, couple to bus 115 via I/O controller 155 and I/O bus 160. One or more expansion busses 165, such as USB, IEEE 1394 bus, ATA, SATA, PCI, PCIE and other busses, couple to bus 115 to facilitate the connection of peripherals and devices to IHS 100. A network interface adapter 170 couples to bus 115 to enable IHS 100 to connect by wire or wirelessly to a network and other information handling systems. While FIG. 1 shows one IHS that employs processor 110, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

A user of IHS 100 loads medium 104 into IHS 100 to store decoder tool 102 on non-volatile storage 145 as code decoder tool 102'. When IHS 100 initializes, the IHS loads operating system 147 into system memory 120 for execution as operating system 147'. The IHS also loads decoder tool 102' into system memory 120 for execution as decoder tool 102". IHS 100 receives an encoded bitstream of video information 201 from a video source 175. For example, network interface 170 may receive the encoded video bitstream by wire or wirelessly from video source 175. Encoded video bitstream 201 may be in a format such as MPEG-4, an advanced video coding standard also known as H.264. The video encoding format may exhibit both high compression and high computational complexity. A video encoding format may include multiple reference frames or pictures that a decoding method may employ to decode pictures from an encoded video bitstream.

Figure 2:
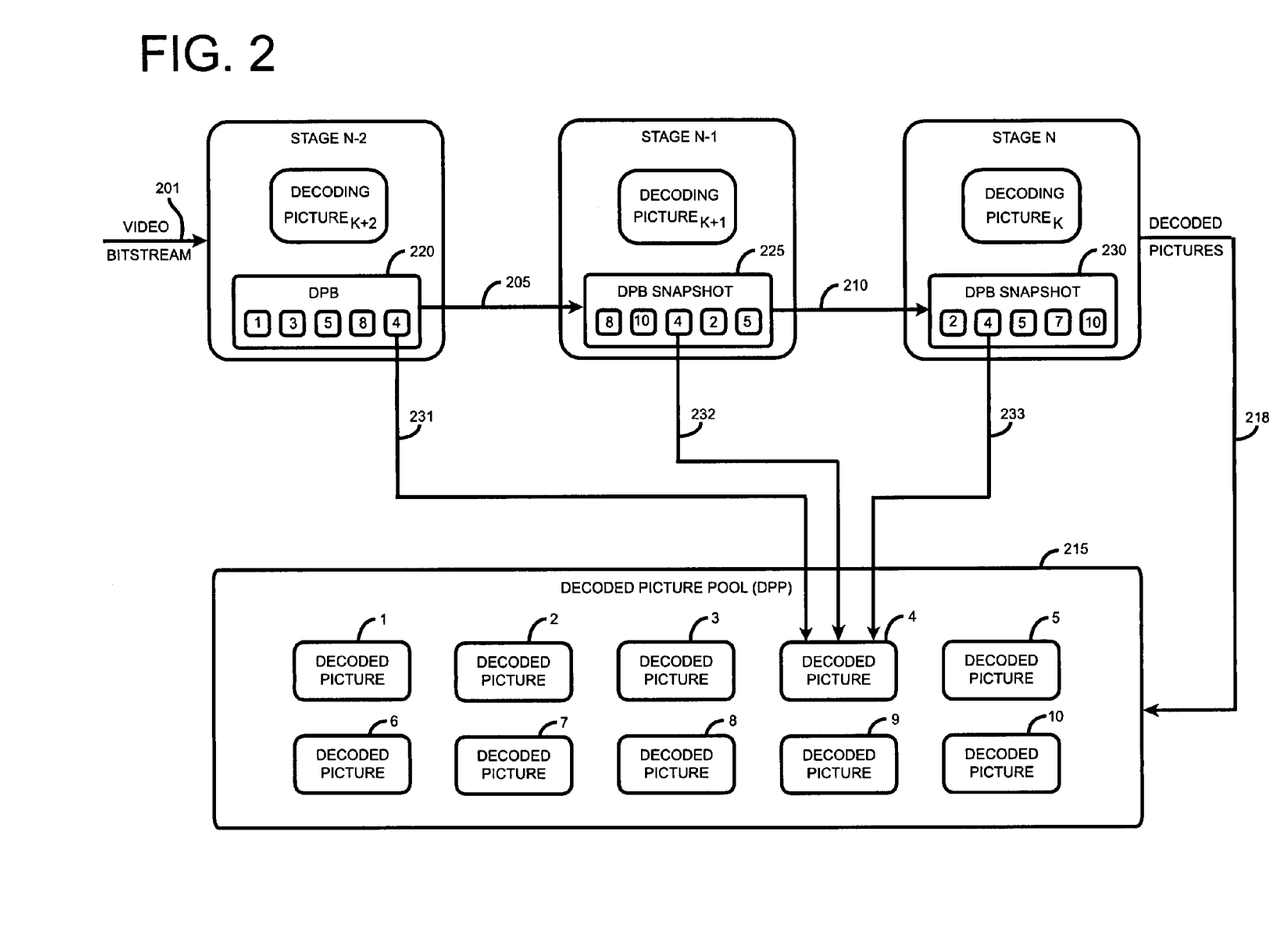
FIG. 2 shows a block diagram of the sequential decoding stages of one embodiment of the disclosed IHS.

IHS 100 partitions the process of decoding the encoded video bitstream 201 into a number of stages, N, that execute in parallel. As seen in the example of FIG. 2, the decoding process includes decoding stages N-2, N-1 and N wherein N-2 is a first decoding stage and N is a last decoding stage. IHS 100 may employ more decoding stages than FIG. 2 depicts, depending on the particular application. Referring now both to FIG. 1 and FIG. 2, IHS 100 maps or assigns stage N-2 to compute element (CE) 111, stage N-1 to compute element (CE) 112 and stage N to compute element (CE) 113. In other words, CE 111 performs the stage N-2 part of the decoding process, CE 112 performs the stage N-1 part of the decoding process and CE 113 performs the stage N part of the decoding process. Decoding stages N-2, N-1 and N are sequential with respect to one another, each stage performing a different part of the decoding method or process.

Stage N-2 includes a decoding picture, K+2, wherein K is the index of any picture in the encoded picture sequence, namely the incoming encoded video bitstream 201. Stage N-1 includes a decoding picture K+1. As pictures from the video bitstream 201 decode in the decoding stages N-2, N-1 and N, the decoding pictures move from stage N-2 to N-1, as indicated by arrow 205, and from stage N-1 to stage N, as indicated by arrow 210. Once fully decoded at the last decoding stage N, fully decoded pictures flow from stage N to decoded picture pool 215, as indicated by arrow line 218. In this particular example, decoded picture pool (DPP) 215 may include and may store up to 10 decoded pictures, namely decoded pictures 1, 2, 3, . . . 10. In one embodiment, decoded picture pool 215 is a portion of a memory such as system memory 120 of IHS 100. Each of pictures 1, 2, 3, . . . 10 exhibits a respective address in system memory 120. DPP 215 may include a number of pictures greater than or less than 10, depending on the particular application.

Stage N-2, namely the stage that first receives the encoded video bitstream 201, includes or associates with a decoded picture buffer (DPB) 220. In one embodiment, DPB 220 physically exists within system memory 120. Decoded picture buffer 220 includes or stores pointers to any particular decoded pictures within decoded picture pool 215 that stage N-2 needs to perform its part of the sequential decoding process. DPB 220 need not store the actual decoded picture, but rather stores a pointer to the decoded picture or pictures that stage N-2 needs in DPP 215. A pointer to a decoded picture may be the decoded picture's address in decoded picture pool (DPP) 215. In this particular embodiment, DPB 220 may store up to 5 pointers or addresses of decoded pictures of DPP 215. For example, DPB 220 may store the addresses of decoded pictures 1, 3, 5, 8 and 4 therein as shown in FIG. 2. One reason that a stage decoding a picture would need access to another already decoded picture is to use that decoded picture as a reference picture.

Stage N-1 includes or associates with a decoded picture buffer snapshot 225 that physically exists within system memory 120. Decoded picture buffer snapshot 225 includes or stores pointers to any particular decoded pictures within decoded picture pool 215 that stage N-1 needs to perform its part of the sequential decoding process. DPB snapshot 225 need not store the actual decoded picture, but rather stores a pointer to the decoded picture or pictures that stage N-1 needs in DPP 215. In this particular embodiment, DPB snapshot 225 may store up to 5 pointers or addresses of decoded pictures that DPP 215 stores. For example, DPB snapshot 225 may store the addresses of decoded pictures 8, 10, 4, 2 and 5 therein as shown in FIG. 2. A DPB snapshot may include a number of pointers to, or addresses of, decoded pictures in decoded picture pool (DPP) 215.

Stage N includes or associates with a decoded picture buffer snapshot 230 that physically exists within system memory 120. Decoded picture buffer snapshot 230 includes or stores pointers to any particular decoded pictures within decoded picture pool 215 that stage N needs to perform its part of the sequential decoding process. DPB snapshot 230 need not store the actual decoded picture, but rather stores a pointer to the decoded picture or pictures that stage N needs in DPP 215. In this particular embodiment, DPB snapshot 230 may store up to 5 pointers or addresses of decoded pictures within DPP 215. For example, DPB snapshot 230 may store the addresses of decoded pictures 2, 4, 5, 7 and 10 therein as shown in FIG. 2. In the particular example that FIG. 2 depicts, stages N-2, N-1 and N each need decoded picture 4 from decoded picture pool (DPP) 215 to perform their respective parts of the decoding process. Thus, DPB 220, DPB snapshot 225 and DPB snapshot 230 each include a pointer to decoded picture 4 of DPP 215. In one embodiment, DPP 215 stores a single copy of decoded picture 4, rather than multiple copies. The pointer to decoded picture 4 may be the address of, or an index to, decoded picture 4 within system memory 120.

DPB 220, DPB snapshot 225 and DPB snapshot 230 may include a greater or lesser number of decoded picture addresses than the 5 shown, depending on the particular application. In the example of FIG. 2, DPB 220, DPB snapshot 225 and DPB snapshot 230 each include a pointer to decoded picture 4 as indicated by arrow lines 231, 232 and 233, respectively. Since decoded picture pool (DPP) 215 stores decoded pictures that stages N-2, N-1 and N need for decoding pictures, these stages need not employ their own respective dedicated decoded picture storage for each stage. In one embodiment, IHS 100 may avoid storing multiple copies of the same decoded picture by sharing a single copy of a needed decoded pictures that decoded picture pool (DPP) stores.

Assume that picture K is a first picture in the encoded video bitstream 201 that a first stage N-2 receives. Also assume that picture K+1 is the second or next picture in the video bitstream 201 that stage N-2 receives. Further assume that picture K+2 is the third or next picture in the video bitstream 201 that stage N-2 receives. Upon receiving picture K from the video bitstream, stage N-2 performs its portion of the decoding process on picture K. Stage N-2 sends the decoding picture K to stage N-1. Stage N-1 performs its portion of the decoding coding process on picture K. Stage N-1 then sends the decoding picture K to the stage N that completes decoding picture K. Stage N is the last stage sequentially in time that decodes and produces a completely decoded picture K. Stage N sends the decoded picture to decoded picture pool (DPP) 215 where DPP 215 stores the decoded picture as one of decoded pictures 1, 2, 3, . . . 10.

Before moving picture K from stage N-2 to stage N-1, IHS 100 takes a snapshot of the pointers in DPB 220 and stores those pointers in DPB snapshot 225, an area of memory 120. By taking a snapshot of the pointers in DPB 220, IHS 100 stores those pointers in memory as snapshot 225 such as seen in FIG. 2. The pointers that DPB snapshot 225 now stores are those pointers that stage N-1 needs to perform the stage N-1 portion of the decoding process for picture K. IHS 100 now updates the pointers of DPB 220 of stage N-2 to reflect the pointers that stage N-2 will need to process the next sequential picture, namely picture K+1. This is why the pointers that FIG. 2 shows for DPB 220 and DPB snapshot 225 are different. FIG. 2 shows representative pointers in DPB 220, DPB snapshot 225 and DPB snapshot 230 at a point in time when stage N-2 and stage N-1 already processed picture K and picture K now resides in stage N.

Before moving picture K from stage N-1 to stage N, IHS 100 takes a snapshot of the pointers in DPB snapshot 225 for picture K and stores those pointers in DPB snapshot 230 of stage N. These pointers that DPB snapshot 230 now stores are the pointers or addresses of decoded pictures in decoded picture pool (DPP) 215 that stage N needs to perform its part of decoding picture K. The pointers in DPB 220, DPB snapshot 225 and DPB snapshot 230 are different in FIG. 2 because each stores the pointers that a respective stage needs to form its part of decoding a respective picture which that stage currently handles. Different stages performing different portions of the decoding process need to access different decoded pictures in decoded picture pool (DPP) 215.

At substantially the same time that IHS 100 takes a snapshot of the pointers in DPB snapshot 225 for subsequent use by stage N in snapshot 230, IHS 100 takes a snapshot of the pointers in DPB 220 for subsequent use by stage N-1 in snapshot 225. FIG. 2 shows picture K after picture K sequentially moved from stage N-2 to N-1 and now exists in stage N. DPB snapshot 230 now stores the pointers to the decoded pictures (2, 4, 5, 7 and 10) that stage N needs to decode picture K. FIG. 2 further shows picture K+1 after picture K+1 sequentially moved from stage N-2 to stage N-1. DPB snapshot 225 now stores the pointers to the decoded pictures (8, 10, 4, 2 and 5) that stage N-1 needs to decode picture K+1. FIG. 2 further shows picture K+2 in stage N-2. This means that stage N-2 receives the latest decoding picture from video bitstream 201. By sequentially using DPB 220, DPB snapshot 225 and DPB snapshot 230, the pointers to particular pictures in DPP 215 that the stages need to decode pictures effectively ride along with decoding pictures as those decoding pictures progress from stage to stage. In this embodiment, DPB 220, DPB snapshot 225 and DPB snapshot 230 include pointers rather than actual copies of pictures.

IHS 100 removes a particular picture from decoded picture pool (DPP) 215 when stage N completes decoding of a picture that needed the particular picture as a reference picture, provided other stages do not need the picture as a reference picture. For example, in FIG. 2 DPB snapshot 230 of stage N includes the pointers 2, 4, 5, 7 and 10. However, DPB snapshot 225 of stage N-1 includes 8, 10, 4, 2 and 5. In one embodiment, if after stage N completes decoding of a picture, stage N-1 does not need a particular picture for which DPB snapshot 230 contained a pointer, then IHS 100 removes the particular picture or pictures from decoded picture pool (DPP) 215. In other words, for those decoded pictures in DPP 215 for which DPB snapshot 230 of stage N contains pointers, if DPB snapshot 225 of stage N-1 does not also contain a pointer to such a picture in DPP 215, then IHS 100 may remove that picture from DPP 215. Thus, in the example of FIG. 2 wherein DPB snapshot 230 includes pointers to decoded pictures 2, 4, 5, 7 and 10, and DPB snapshot 225 includes pointers to decoded pictures 8, 10, 4, 2 and 5 in DPP 215, 100 IHS may remove pictures 1, 3, 6, 7, and 9 from DPP 215 after processing of picture K in stage N is complete.

Figure 3:
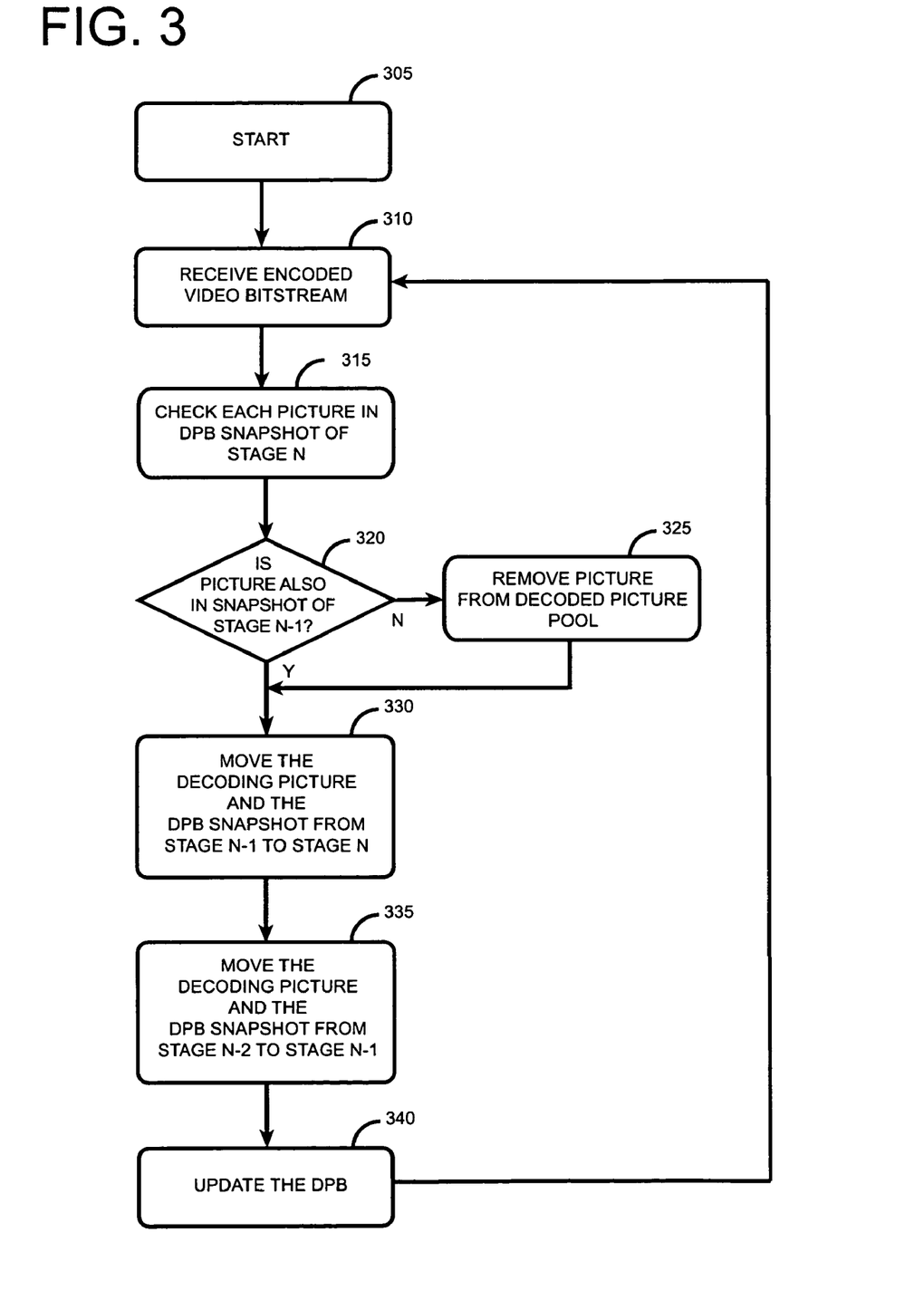
FIG. 3 is a flowchart of the disclosed decoding methodology.

FIG. 3 is a flowchart that depicts representative process flow in one embodiment of the disclosed decoding methodology. Process flow commences at start block 305. IHS 100 receives an encoded video bitstream including a series of sequential pictures, as per block 310. The method now performs a determination of whether or not to remove particular already decoded pictures from decoded picture pool (DPP) 215. To perform this determination, IHS 100 accesses each picture with a pointer or address in DPB snapshot 230 of stage N, as per block 315. IHS 100 performs a test to determine if the DPB snapshot 225 of stage N-1 references any of the decoded pictures that DPB snapshot 230 of stage N references, as per decision block 320. If the DPB snapshot 225 of stage N-1 does not reference a particular decoded picture that DPB snapshot 230 references, then IHS 100 may remove that particular picture or pictures from decoded picture pool (DPP) 215, as per block 325. Otherwise, process flow continues and IHS 100 moves the decoding picture and respective DPB snapshot from stage N-1 to stage N, as per block 330. IHS 100 also moves the decoding picture and respective DPB snapshot from stage N-2 to stage N-1 as per block 335. IHS 100 updates the decoded picture buffer (DPB) 220, as per block 340. Flow continues back to block 310 which continues to receive the encoded video bitstream.

Figure 4A:
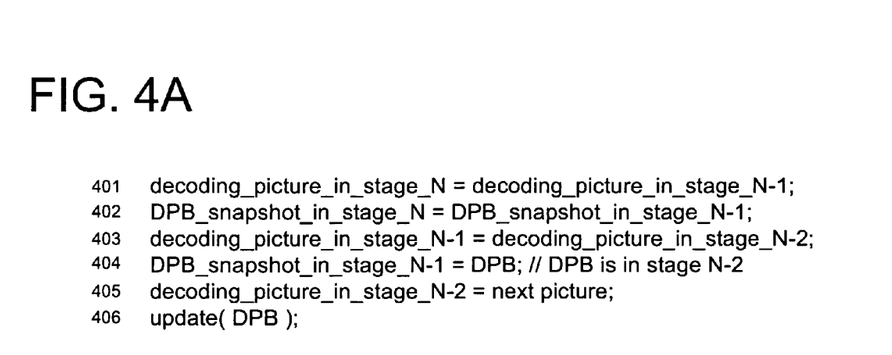
FIG. 4 shows representative pseudocode for implementing the disclosed decoding methodology.

FIG. 4A shows pseudocode for implementing one embodiment of the disclosed methodology. Referring to both the block diagram of FIG. 2 and the pseudocode of FIG. 4A, IHS 100 moves decoding pictures through the stages N-2, N-1 and N of the decoding process from video bitstream 201 to decoded pictures output 218. To achieve this movement and partial decoding by each stage, IHS 100 sets the decoding picture in stage N to equal the decoding picture in stage N-1, as per line 401. IHS 100 also sets the DPB snapshot in stage N equal to the DPB snapshot in stage N-1, as per line 402. This effectively moves the decoding picture from stage N-1 to stage N and also moves the DPB snapshot of that decoding picture from stage N-1 to stage N.

IHS 100 sets the decoding picture in stage N-1 to equal the decoding picture in stage N-2, as per block 403. IHS 203 also sets the DPB snapshot in stage N-1 to equal the DPB 220, as per block 404. This effectively moves the decoding picture from stage N-2 to stage N-1 and also moves the DPB snapshot of that decoding picture from stage N-2 to stage N-1 The decoding picture in stage N-2 is the next picture in the bitstream, as per line 405. IHS then updates the DPB 220, as per block 406.

Figure 4B:
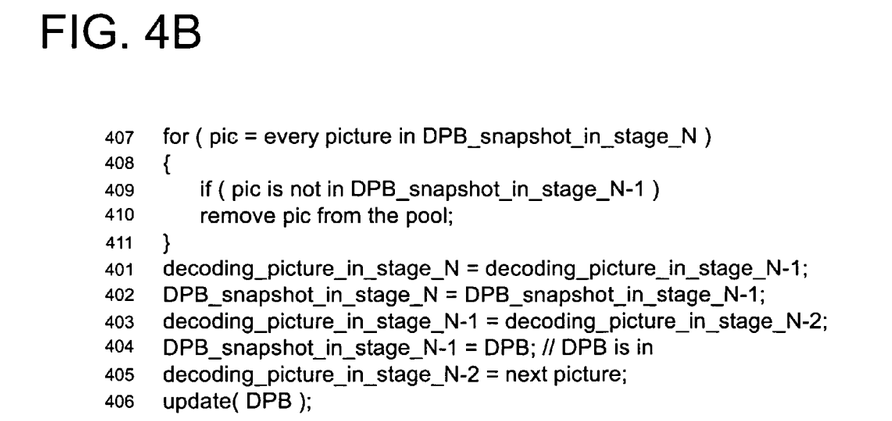

FIG. 4B shows pseudocode for implementing one embodiment of the disclosed methodology that provides for removal of decoded pictures from decoded picture pool (DPP) 215. The pseudocode of FIG. 4B includes lines 401-406 of the pseudocode of FIG. 4A. The pseudocode of FIG. 4B also includes lines 407-411 that provide for removal of decoded pictures from decoded picture pool (DPP) 215 under specified conditions. To implement this decoded picture removal, IHS 100 checks each of the pictures in the DPB snapshot of stage N, as per line 407. If IHS 100 determines that a decoded picture in the DPB snapshot of stage N is not in the DPB snapshot of stage N-1, as per line 409, then IHS 100 removes such decoded pictures from DPP 215, as per block 410. Process flow then continues with line 411 and 401. After performing the DPB 220 update of line 406, IHS 100 returns to line 407 and continues the decoding process.

Those skilled in the art will appreciate that the various structures disclosed can be implemented in hardware or software. Moreover, the methodology represented by the blocks of the flowchart of FIG. 3 may be embodied in a computer program product, such as a media disk, media drive or other media storage such as computer program product medium 104 of FIG. 1.

In one embodiment, decoder tool 102 implements the disclosed methodology as a set of instructions (program code) in a code module which may, for example, reside in the system memory 120 of IHS 100 of FIG. 1. Until IHS 100 requires this set of instructions, another memory, for example, non-volatile storage 145 such as a hard disk drive, or a removable memory such as an optical disk or floppy disk, may store this set of instructions. IHS 100 may also download this set of instructions via the Internet or other computer network. Thus, a computer program product may implement the disclosed methodology for use in a computer such as IHS 100. In such a software embodiment, RAM or system memory 120 may store code that carries out the functions described in the flowchart of FIG. 3 while processor 110 executes such code. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of decoding pictures, comprising:
receiving, by an information handling system (IHS), an encoded bitstream that includes pictures;
partitioning, by the IHS, decoding of the pictures of the encoded bitstream into N sequential stages that process the pictures as decoding pictures, wherein N is the number of sequential stages;
mapping, by the IHS, the sequential stages onto N compute elements of the IHS that execute in parallel;
storing, in a memory of the IHS, a decoded picture buffer for a first stage of the N sequential stages, the first stage receiving the encoded bitstream;
storing, in the memory of the IHS, a respective decoded picture buffer snapshot for each of the sequential stages other than the first sequential stage; and
storing, in the memory of the IHS, a decoded picture pool of decoded pictures for sharing among the sequential stages;
wherein the decoded picture buffer and decoded picture buffer snapshots include pointers to decoded pictures in the decoded picture pool that the sequential stages need for decoding the encoded bitstream.

2. The method of claim 1, wherein the sequential stage N supplies decoded pictures to the decoded picture pool in the memory.

3. The method of claim 1, wherein the decoded picture pool includes a single copy of each decoded picture, the sequential stages sharing the single copy of each decoded picture.

4. The method of claim 1, further comprising removing a particular decoded picture from the decoded picture pool when the sequential stage N includes a pointer to the particular decoded picture and an adjacent stage N-1 does not include a pointer to the particular decoded picture.

5. The method of claim 1, further comprising updating the decoded picture buffer of the first stage of N sequential decoding stages wherein the first stage is an N-2 stage.

6. The method of claim 1, further comprising moving a decoding picture and a respective decoded picture buffer snapshot from a stage N-1 to stage N.

7. The method of claim 6, further comprising moving a decoding picture and a respective decoded picture buffer snapshot from a stage N-2 to stage N-1.

8. An information handling system (IHS), comprising:
a processor that includes multiple compute elements that decode pictures from an encoded bitstream, wherein the processor partitions the decoding of pictures into N sequential stages that process the pictures as decoding pictures, wherein N is the number of sequential stages, wherein each compute element performs a different sequential stage of the N sequential stages, the compute elements executing in parallel; and a memory, coupled to the processor, wherein the memory stores a decoded picture buffer associated with a first stage of the N sequential stages, the first stage receiving the encoded bitstream, wherein the memory stores a respective decoded picture buffer snapshot for each of the sequential stages other than the first sequential stage, wherein the memory further stores a decoded picture pool of decoded pictures for sharing among the sequential stages;

wherein the decoded picture buffer and decoded picture buffer snapshots include pointers to decoded pictures in the decoded picture pool that the sequential stages need for decoding the encoded bitstream.

9. The IHS of claim 8, wherein the sequential stage N supplies decoded pictures to the decoded picture pool in the memory.

10. The IHS of claim 8, wherein the decoded picture pool includes a single copy of each decoded picture, the sequential stages sharing the single copy of each decoded picture.

11. The IHS of claim 8, wherein the processor removes a particular decoded picture from the decoded picture pool when the sequential stage N includes a pointer to the particular decoded picture and an adjacent stage N-1 does not include a pointer to the particular decoded picture.

12. The IHS of claim 8, wherein the processor updates the decoded picture buffer of the first stage of N sequential decoding stages wherein the first stage is an N-2 stage.

13. The IHS of claim 8, wherein the processor moves a decoding picture and a respective decoded picture buffer snapshot from a stage N-1 to stage N.

14. The IHS of claim 13, wherein the processor moves a decoding picture and a respective decoded picture buffer snapshot from a stage N-2 to stage N-1.

15. A computer program product stored on a non-transitory computer operable medium, comprising:

instructions that receive an encoded bitstream that includes pictures;

instructions that partition decoding of the pictures of the encoded bitstream into N sequential stages that process the pictures as decoding pictures, wherein N is the number of sequential stages;

instructions that map the sequential stages onto N compute elements that execute in parallel;

instructions that store, in a memory, a decoded picture buffer for a first stage of the N sequential stages, the first stage receiving the encoded bitstream;

instructions that store, in the memory, a respective decoded picture buffer snapshot for each of the sequential stages other than the first sequential stage;

instructions that store, in the memory, a decoded picture pool of decoded pictures for sharing among the sequential stages; and instructions that configure the decoded picture buffer and decoded picture buffer snapshots to include pointers to decoded pictures in the decoded picture pool that the sequential stages need for decoding the encoded bitstream.

16. The computer program product of claim 15, including instructions that instruct the processor to remove a particular decoded picture from the decoded picture pool when the sequential stage N includes a pointer to the particular decoded picture and an adjacent stage N-1 does not include a pointer to the particular decoded picture.

17. The computer program product of claim 15, including instructions that instruct the processor to update the decoded picture buffer of the first stage of N sequential decoding stages wherein the first stage is an N-2 stage.

18. The computer program product of claim 15, including instructions that instruct the processor to move a decoding picture and a respective decoded picture buffer snapshot from a stage N-1 to stage N.

19. The computer program product of claim 18, including instructions that instruct the processor to move a decoding picture and a respective decoded picture buffer snapshot from a stage N-2 to stage N-1.

* * * * *